(Model.)
W. A. FRIES.
FIRE AND STEAM HOSE.
No. 306,236.                Patented Oct. 7, 1884.
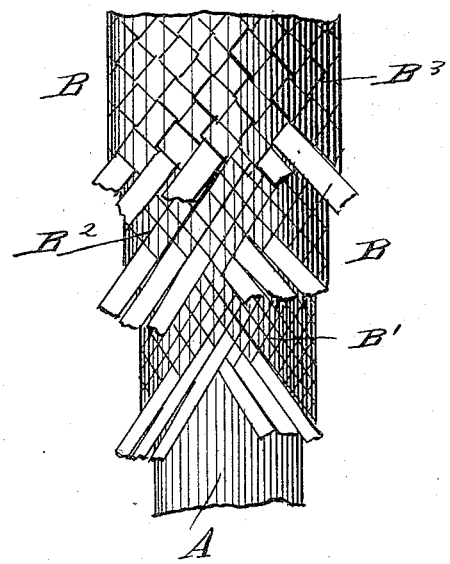
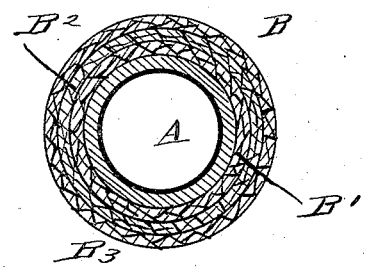
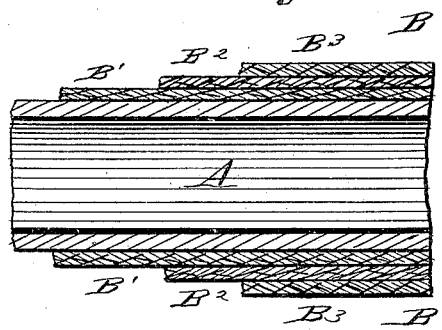

UNITED STATES PATENT OFFICE.

WILLIAM ARMSTRONG FRIES, OF CLIFTON HEIGHTS, PENNSYLVANIA.

FIRE AND STEAM HOSE.

SPECIFICATION forming part of Letters Patent No. 306,236, dated October 7, 1884.

Application filed January 31, 1883. Renewed March 5, 1884. (Model.)

*To all whom it may concern:*

Be it known that I, WILLIAM ARMSTRONG FRIES, a citizen of the United States, now residing at Clifton Heights, Delaware county, in the State of Pennsylvania, and lately of Philadelphia, Pennsylvania, have invented certain new and useful Improvements in Fire and Steam Hose; and I do hereby declare the following to be a sufficiently full, clear, and exact description thereof to enable others skilled in the art to make and use the said invention.

The object of this invention is to furnish, for purposes of protection against accidental fire, a hose which will not be liable to burn while exposed to fire, as has often occurred in cases of delay in turning water into buildings in conflagration, and also a hose which, although hot steam or water may be passing through, will not lose much heat by radiation, and which may be handled without burning or scalding the hands.

To effect these ends my invention consists in a flexible hose made in the usual way, with water-proof lining covered with asbestus filaments braided over it in successive layers.

The mode of making this invention is as follows, referring to the drawings, in which Figure 1 is an elevation of the hose in course of covering; Fig. 2, a longitudinal section, and Fig. 3 a transverse section.

The same letters of reference apply to the same parts in the several figures.

A is a tube of linen or canvas lined with caoutchouc or other flexible water-proof material.

B is a covering formed of filaments of asbestus braided upon the tube A in layers, B' B² B³, and so on, until the requisite thickness for non-conducting purposes is attained.

The braiding is effected in the usual mode by double series of bobbins revolving in serpentine paths in opposite directions, in the same manner as whips are plaited by machines of the usual construction.

Hose thus constructed is used in the same manner as other woven or textile hose, care being taken in attaching couplings to secure such a length of the hose by the ferrules extending internally and the banding or wiring externally as to hold the several laminæ of asbestus filaments as well as the water-proof lining.

Hose so made can be exposed to temperatures which would destroy any organic fibers or tissues. When applied to connecting steam-pipes or hot-water pipes, it is flexible, loses but little heat by radiation, and can be handled without burning or scalding the hands.

I am aware that steam-pipes have been covered with compounds containing asbestus for the purpose of avoiding loss of heat by radiation and to avoid the undesirable heating of surrounding objects. Such applications of asbestus to steam-pipes I do not claim; but, Having described my invention, what I claim as my invention is—

An improved article of manufacture consisting, essentially, of a flexible fluid-tight hose covered with filaments of asbestus braided in laminæ thereon, substantially as set forth and described.

WM. ARMSTRONG FRIES.

Witnesses:
   J. DANIEL EBY,
   LINN WHEELER.